United States Patent
Kellermann

(10) Patent No.: US 7,265,551 B2
(45) Date of Patent: Sep. 4, 2007

(54) METAL DETECTOR, IN PARTICULAR MINE DETECTOR

(75) Inventor: Gerd Kellermann, Vienna (AT)

(73) Assignee: Schiebel Elektronische Geraete GmbH, Vienna (AT)

( * ) Notice: Subject to any disclaimer, the term of this patent is extended or adjusted under 35 U.S.C. 154(b) by 194 days.

(21) Appl. No.: 11/203,871

(22) Filed: Aug. 15, 2005

(65) Prior Publication Data
US 2006/0038569 A1    Feb. 23, 2006

(30) Foreign Application Priority Data
Aug. 13, 2004  (AT)  ............... A 1372/2004

(51) Int. Cl.
*G01V 3/11* (2006.01)
*G01S 13/06* (2006.01)
(52) U.S. Cl. ........................ 324/326; 342/22
(58) Field of Classification Search ................ 324/326, 324/327; 340/551; 367/42, 87, 99
See application file for complete search history.

(56) References Cited

U.S. PATENT DOCUMENTS

| | | | | |
|---|---|---|---|---|
| 4,905,008 A | * | 2/1990 | Kawano et al. | 342/22 |
| 6,501,414 B2 | * | 12/2002 | Arndt et al. | 342/22 |
| 6,657,577 B1 | * | 12/2003 | Gregersen et al. | 342/22 |
| 6,967,574 B1 | * | 11/2005 | Nelson | 340/551 |
| 2003/0052684 A1 | * | 3/2003 | Nelson et al. | 324/329 |
| 2003/0136249 A1 | * | 7/2003 | Inoue et al. | 89/1.13 |
| 2006/0284758 A1 | * | 12/2006 | Stilwell et al. | 342/22 |

* cited by examiner

*Primary Examiner*—Edward Lefkowitz
*Assistant Examiner*—Kenneth J Whittington
(74) *Attorney, Agent, or Firm*—Laurence A. Greenberg; Werner H. Stemer; Ralph E. Locher

(57) ABSTRACT

A mine detector has a search head with a transmitting unit for the transmission of signal sequences into the ground, and a metal detection unit. A distance measurement sensor is arranged on the search head for determination of the current geometric distance of the search head from the ground. The response signal sensor and the distance measurement sensor are each connected for dataflow purposes to a measurement data logic unit which can be supplied with ground distance measurement data when the distance between the search head and the ground surface changes, in order to produce a distance/signal strength curve. The measurement data logic unit is connected for data interchange purposes to a curve comparison unit, which is itself connected for data interchange purposes to a standard curve and algorithm storage unit and can be supplied from there with the standard distance/signal strength curves and algorithms. Further, the parameter information which is associated with the signal strength curve selected from the standard curve storage unit can be emitted from the curve comparison unit via a categorization unit to a display unit on the mine detector.

11 Claims, 2 Drawing Sheets

METAL DETECTOR, IN PARTICULAR MINE DETECTOR

BACKGROUND OF THE INVENTION

Field of the Invention

The present invention relates to a novel metal detector, in particular a mine detector, which can preferably be carried, for finding and locating metal objects which are located under the surface of the ground, the subsoil or the like, in particular of land mines which have at least one metal component and are buried there, having a search head with a transmitting unit for transmission of electrical and/or magnetic signals or signal sequences into the ground, the subsoil or the like, and having a metal detection unit which has a receiving unit for the response signals or response signal sequences with at least one response signal strength sensor and a device for indicating or displaying the presence of a metal object, in particular of a mine in the ground, the subsoil or the like.

SUMMARY OF THE INVENTION

Traditional landmines have been used for military purposes as one of the most effective defensive weapon systems against land forces, for a long time. The mines can be laid manually or mechanically. When laid mechanically, for example, the mine bodies are buried at a depth of up to 50 cm in the ground or subsoil and thus cannot be seen by the infantry, but also cannot be seen by the civilian population. Thus, particularly after the end of the armed conflict, mine clearance over large areas represents a major task for dispensing with the consequences of war, which is unfortunately not only labor intensive and time-consuming, but is also associated with major risks to the mine clearance personnel.

In addition to searching for mines, there is also still a frequent demand for tracing and locating metallic objects in the ground, even if this is only, for example, for archeological purposes.

With regard to the operation of metal detectors, the following text will just briefly state that any metal object which can be traced by means of a metal detector distorts the electromagnetic field that is formed by its signal transmitting unit, for example a search coil, and that this distortion can be used in the normal search devices to date to indicate the metal object found, in particular the mine that has been found, still predominantly by means of an acoustic signal.

Basically, the procedure for conventional mine searching is that the operator swings the search head of the appliance to and fro approximately horizontally at as short a distance above the ground as possible above the object to be located, for example at a speed of about 0.5 m/s. During this process, a characteristic signal is heard in the appliance headset when the search head is pulled over a metal object. The intensity and frequency of the acoustic signal change during the movement of the search head, in this way allowing quite exact horizontal location of the mine, although it should also be stressed that this type of search and acoustic indication do not allow valid estimation of the depth and size of the metal object, to any extent.

By way of example, mine detectors can operate on the frequency principle, and in this case advantageously in a frequency range of electromagnetic oscillations from 1 to 100 kHz. This makes use of the principle that an AC voltage which is coupled to its magnetic field generates eddy currents in the metal object that is located in the ground or is buried there, and these can then be detected by means of the receiving unit. The differences between the commercially available appliances are, for example, the choice of the frequencies emitted by their transmitting unit. In the case of appliances which operate with only one frequency, the phase shift and/or the attenuation of the emitted output signal are/is normally used for detection of a metal object. Multiple frequency appliances are, furthermore, also used, in which the detection is made on the basis of the real and imaginary parts at a plurality of frequencies.

Various geological structures, such as soils containing magnetic materials, lead to adverse effects on the signal indication, and the data thus obtained must be appropriately corrected and compensated. Furthermore, metal detectors and mine detectors should comply with the requirement to correspond as far as possible to different types of metals and shapes of metallic objects since they and the metallic components which are used in mines are in fact formed with qualitatively very different and differently shaped metal components, thus leading to erroneous indications.

With regard to the wide variability of the metal objects to be looked for, in particular of the metal components contained in mines, it has been found in practice that, for actually effective location of metal objects, in particular for actually effective clearance of a minefield, an at least rough estimate of the depth and size and, furthermore if required, the material character of the metal objects and of the mines and/or of the metal components contained in them can represent a very major and often critical aid.

SUMMARY OF THE INVENTION

It is accordingly an object of the invention to provide a metal detector, in particular a mine detector which overcomes the above-mentioned disadvantages of the heretofore-known devices and methods of this general type and which, for the first time, allows such estimation of the depth and/or size of a metal object.

With the foregoing and other objects in view there is provided, in accordance with the invention, a metal detector, such as a mine detector, for finding and locating metal objects located underneath a ground surface, wherein the ground has a specific ground character, comprising:

a search head with a transmitting unit for transmitting electrical and/or magnetic signals or signal sequences past the surface;

a metal detection unit with a receiving unit for response signals or response signal sequences, said receiving unit having at least one response signal strength sensor, and a device for indicating or displaying a presence of a metal object underneath the surface;

a distance measurement sensor disposed on or in said search head and configured to estimate a depth and a size of the metal object, said distance measurement sensor having a transmitting unit for transmitting signals at frequencies which can each be set to desired values, and configured to determine an actual instantaneous geometric distance between said search head and the ground surface;

a measurement data logic unit disposed to receive data from said response signal sensor and said distance measurement sensor, said measurement data logic unit receiving sets of response field strength measurement data and response signal level measurement data, and ground distance measurement data, in each case determined at a time in an event of a change in the distance between the search head and the ground surface when said search head is raised or lowered from or to the ground surface and generating a respective instantaneous distance/signal strength curve or algorithm reflecting a functionality between the response signal and the distance between said search head and the surface in digitized form or as a data packet;

a curve comparison unit connected for dataflow and data interchange to said measurement data logic unit, and a standard curve and algorithm storage unit connected for dataflow and data interchange to said curve comparison unit, said standard curve and algorithm storage unit containing, stored together with information associated therewith relating to various parameters, a collection, matrix or library with a large number of standard distance/signal strength curves or algorithms, represented in digitized form or as a data packet, predetermined with a comparative detector of a same type from a large number of different, in each case predetermined standard conditions or with predetermined standard parameters selected from the group consisting of depth, size, volume and/or area extent, shape and position of the measurement object, frequency of the signals transmitted from the transmitting unit, and the ground character, and being configured to be supplied therefrom with the standard distance/signal strength curves or algorithms, and equipped with software for selection of a standard distance/signal strength curve or algorithm stored in said standard curve and algorithm storage unit and most similar to the respective distance/signal strength curve or algorithm determined at that time for the metal object currently being located; and a categorization unit for emitting from said curve and algorithm comparison unit parameter information associated with the respective standard distance/signal strength curve or algorithm selected from said standard curve storage unit and which is most similar with respect to the size and depth of the metal object, said categorization unit converting the information to qualitative or semi-quantitative object depth data and object size data, to a display unit configured to display in a small number of discrete measurement value steps at least those values that correspond to the depth and the size of the respective currently located measurement object, at a point which is easily visible for a user of the metal detector.

A major contribution to the achievement of this object has been the observation, confirmed by a large number of corresponding tests, that the signal level of the changed, attenuated electromagnetic oscillations radiated back from metallic objects changes in a characteristic manner as a function of the size of the respectively located metal object and of its respective depth, and as a function of other factors, such as the nature of the metal, and the distance between the search head of the appliance, or its search coil, and the metallic object to be located.

The subject matter of the invention is accordingly a metal detector, in particular a mine detector, of the type mentioned initially in the first paragraph of the introductory text. The invention is characterized as follows:

in order to estimate the depth and size of the metal object, a distance measurement sensor is arranged on or in the search head (which is preferably equipped with a transmitting unit for the transmission of signals at frequencies which can each be set to desired values) of the metal detector, in particular mine detector, in addition to the metal detection unit with the response signal sensor, for determination of the actual instantaneous geometric distance between the search head and the surface of the ground, subsoil or the like, which in each case has a specific ground character;

the response signal sensor and the distance measurement sensor are each connected for dataflow purposes to a measurement data logic unit—which can be supplied with the sets of response signal measurement data, in particular response field strength measurement data and response signal level measurement data, and ground distance measurement data (in each case determined at the time in the event of a change in the distance between the search head and the ground surface, in particular by raising or lowering of the search head from or to the ground surface by the response signal sensor and by the distance measurement sensor—in order to produce a respective instantaneous distance/signal strength curve or algorithm—which reflects the functionality between the response signal and the search head/ground distance preferably in digitized form or as a data packet;

the measurement data logic unit is connected for dataflow and data interchange purposes to a curve and algorithm comparison unit which is itself connected for dataflow and data interchange purposes to a standard curve and algorithm storage unit which contains, stored together with the information associated with them relating to the parameters just mentioned, a collection, matrix or library with a large number of standard distance/signal strength curves or algorithms, which are preferably represented in digitized form or as a data packet, determined from the start with a metal detector or mine detector of the same type among a large number of different, in each case predetermined standard conditions or with predetermined standard parameters in particular such as the depth, size and volume and/or area extent, shape and position of the measurement object, frequency of the signals transmitted from the transmitting unit, and the ground character, and can be supplied therefrom with the standard distance/signal strength curve with the parameters associated with them, and is furthermore equipped with software for selection of that standard distance/signal strength curve which is stored in the standard curve storage unit and is most similar to the respective distance/signal strength curve or algorithm determined at that time for the metal object currently being located; and the parameter information which is associated with the respective standard distance/signal strength curve or algorithm selected and which is most similar, in particular with respect to the size and depth of the metal object, can be emitted from the curve comparison unit mentioned via a categorization unit, which converts this information to qualitative or semi-quantitative object depth data and object size data, to a preferably visual display unit, which emits in a small number of discrete measurement value steps at least those values which correspond to the depth and the size of the respective currently located measurement object, at a point which is easily visible for the user on the metal detector, in particular mine detector.

The primary concept of the present invention is that, for the first time, the characteristic of the change in the response signals and/or signal levels at the detector of the metal detector with the distance between the search head and the subsoil is used as a criterion for estimation of the depth and size of the metal object or metal component of a mine.

One major feature of the novel metal detector or mine detector is that, although it is guided over the subsoil that is concealing it using, for example, a horizontal oscillating swinging movement in a manner known per se in order to locate the metal object, a change is, however, made in a quite specific manner in the distance between the search head and the ground surface in the vertical direction above the subsoil concealing the located metal object, for example after finding the position of this metal object. The characteristic profile curve which is determined in the course of the change in this "height" above the ground surface which essentially reflects the fundamental relationship between the signal level and the distance between the search head and the ground, or the algorithm of this type, is compared with the standard curves and algorithms which are recorded in the library or the like (which is stored, for example, in a memory chip in the appliance) of metal objects of various defined sizes which have previously been positioned in the ground at different defined depths. In the most optimum case, for example, only one or a single depth/ground distance standard curve or algorithm will be found in the library which is virtually identical to the curve or algorithm of this type which has just actually been determined, and the size and the depth of the currently located metallic object can be displayed on the visual display area of the metal detector on the basis of the details or parameters stored together with this standard curve or algorithm, and thus associated with it.

However, in the majority of cases, the respective currently determined ground distance/signal level curve or algorithm will correspond to a number of standard curves or algorithms which are stored within the library or in the storage unit and whose profile is similar within a certain bandwidth. In this case, the parameters relating to the height and size of the metal object which are associated with the standard curves or algorithms that have been found are emitted by means of appropriate software after running through a data reduction program or the like in the form of semi-quantitative details relating to the depth and metal object size, for example in the form: "deep and large", "slightly below the surface and large", "medium depth and medium size" and the like.

According to one first preferred embodiment of the invention, an input unit which is supported by an appropriate software package is provided on or in the metal detector for adjustment (which can be matched as optimally as possible to the metal object) of its transmission frequency and/or for the adjustment of the parameters which take account of the current ground character, and/or of parameters which take account of the nature of the metal in the alloy of the metal object.

Additional information is provided relating to the sensor which is significant for the novel metal detector (which provides semi-quantitative details relating to the depth and/or size of a located metal object) for the measurement of the distance between the search head and the ground surface, which constantly changes during the raising of the search head from the ground or while it is being lowered towards the ground.

An embodiment (advantageous for the purpose of indication of the semi-quantitative data relating to the depth and size of a metal object) of the visual display units, which are provided for reproduction of this data, on the metal detector.

It should be stressed here that the display or indication need, of course, in no way be restricted to a visual display, and it can also be accompanied by an acoustic indication, as is provided in any case in most mine detectors. The visual display mentioned above is in no way restricted to illuminated small lamps, light-emitting diodes or the like, and it is also possible to provide a display on an LCD or plasma screen, for example in a brief verbal form.

As a further significant subject matter, the invention covers a novel method for finding and locating metal objects which are located under the surface of the ground, subsoil or the like, in particular of mines which have at least one metal component and are buried there, using a metal detector, in particular a mine detector, with a search head having at least one transmitting unit for the transmission of electrical and/or magnetic signals or signal sequences into the ground, subsoil or the like, and having a metal detection unit, which has at least one receiving unit for the response signals or response signal sequences with at least one field strength sensor and a device for indicating or displaying the presence of a metal object, in particular of a mine in the ground, subsoil or the like and additionally has a distance measurement sensor.

With the above and other objects in view there is also provided, in accordance with the invention, a method that may be characterized as follows:

in a first stage—corresponding to a range of different discrete measurement condition parameters—metal objects of a discrete different size, shape or form, spatial position and composed of different metals or the like, are positioned in subsoils or soils of different character at different discrete depths underneath the ground surface;

in a second stage, a family of standard distance/signal strength curves and algorithms which are applicable to a parameter which is in each case set for changing, discrete values—while keeping all the other parameters constant—is produced by means of the metal detector—in each case after choosing and setting one of the parameters mentioned and, possibly, an appliance-specific parameter, in particular the transmission signal frequency, of the appliance to predetermined discrete different values—while keeping all the other parameters constant at the same time—by means of the metal detector which is equipped with the ground distance measurement sensor while, preferably continuously, changing the distance of its search head from the ground surface, in particular by raising the search head from it, by means of the measurement data logic unit of the metal detector, with this family being stored and saved in the standard curve and algorithm storage unit, and with this procedure being continued in an analogous manner with appropriate changes to the respective parameters to be changed discretely, and with each of the to other parameters being kept constant at the same time, until a standard ground distance/signal strength curve and algorithm library or the like is obtained;

in a third stage, after location of a metal object which is unknown in terms of the abovementioned parameters, in particular the object size and depth, the distance of the search head from the ground surface is changed by means of the same metal detector, or by means of a metal detector of the same type, in particular by raising the search head from the ground surface, and in that a current distance/signal strength curve or algorithm is produced by means of the measurement data logic unit from the current ground distance and response signal strength measurement data and is compared in the comparison unit with the standard distance/signal strength curves and algorithms which are called up from the standard curve and algorithm storage unit, with that standard distance/signal strength curve or algorithm which is most similar in terms of the coordinate position and profile to the respective currently determined distance/signal strength curve or algorithm being selected, and its depth parameter and object size parameter being passed on to the preferably visual object size and depth display unit which converts these parameters to a small number of clear display steps, from where the same, in a fourth stage, is read by the person operating the metal detector, on the basis of which and on the basis of the semi-quantitatively displayed object size and depth, the metal object is finally recovered.

The novel method, which is closely linked with the use of the novel metal detector, for semi-quantitative estimation of the depth and size of a metal object located in the ground requires, as to be expected on the basis of the above statements relating to the first stage of the method, a large number of measurements in advance, in different (in each case exactly defined) conditions and with defined adjustment of the widely differing parameters, on the basis of which digitized standard ground distance/signal level curves are produced which take account of the various conditions and the influence of the other defined parameters that influence the signal level apart from the depth and object size, such as the ground character, the nature of the metal of the metal object and the like, this being done in each case for an appliance of a specific type. Once this large number of ground distance/signal level curves and algorithms have been recorded and have been stored as a "library" or the like in the standard curve and algorithm storage unit, this library just needs to be installed, for example in the form of an appropriate superchip, in all the appliances of the respective type, and these appliances are then fully operational for depth location and object size estimation virtually without any further adaptations.

If a change is to be made to a type of metal detector with a different configuration and characteristic, the standard curve and algorithm library in the storage unit, once it has been produced, can be transported by means of adaptation software, which characteristically modifies the standard curves for the new type of appliance, to a standard curve and algorithm library matched to the new appliance type, so that there is no longer any need to carry out a complex rerecording process for all of the ground distance/depth curves and algorithms in conditions to be varied in a defined manner for the appliances of the new type.

Other features which are considered as characteristic for the invention are set forth in the appended claims.

Although the invention is illustrated and described herein as embodied in a metal detector, especially a mine detector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
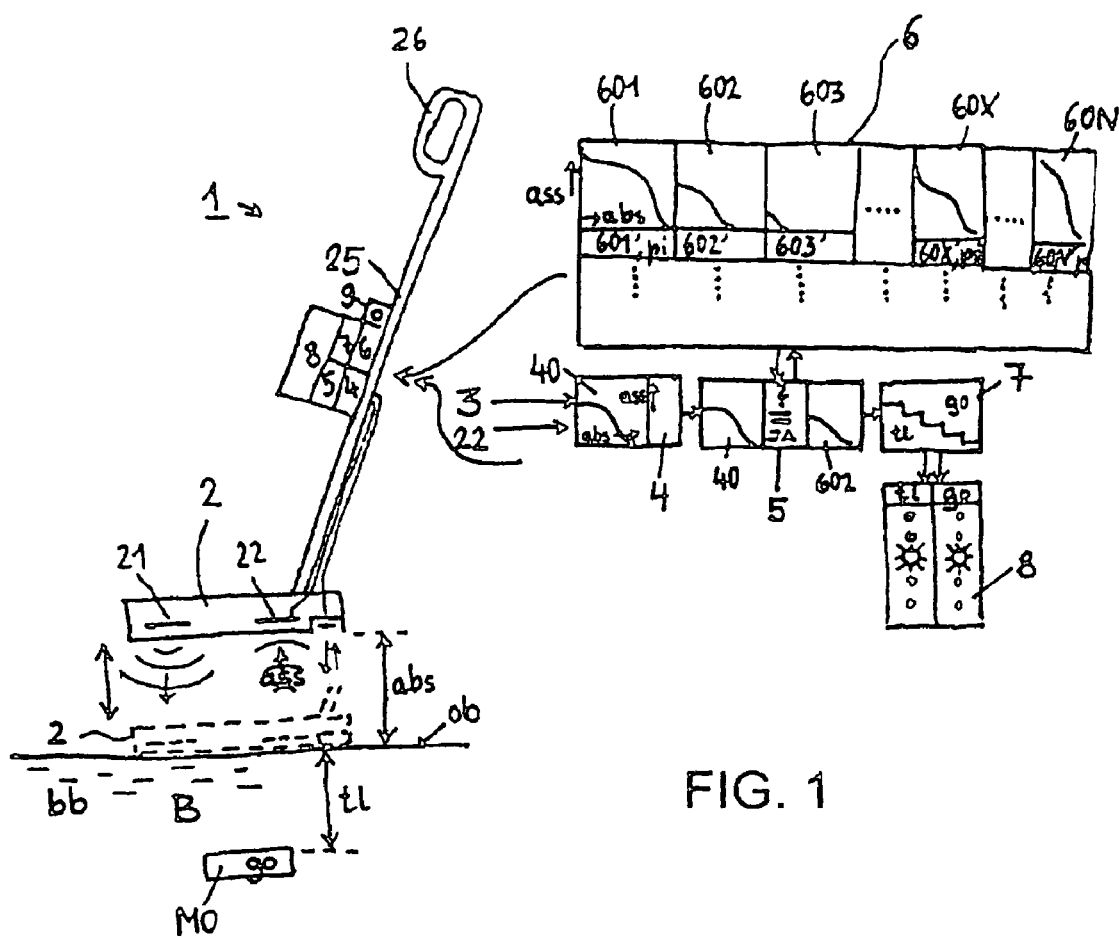
FIG. 1 is a schematic view of a device according to the invention and a measurement method being carried out.

Referring now to the figures of the drawing in detail and first, particularly, to FIG. 1 thereof, there is shown a metal object MO with the object size go buried at a depth tl below the surface ob of ground B. The ground B has ground characteristics bb.

The search head 2, which has a signal transmitting unit 21 and a unit 22 for reception of the response signals rss, of the metal detector 1, which has a rod 25 and a manipulation handle 26, is raised from a position very close to the ground surface ob, as is indicated by dashed lines in the drawing, through a distance abs above the ground B or its surface ob, with the data relating to the changing ground distance abs during raising and lowering of the search head 2 above and towards the ground surface ob, and the response signal level data which varies continuously as this distance is changed, being recorded continuously by means of the ground distance measurement sensor 3, and being converted in the measurement data logic unit 4 to the respective current digitized ground distance/signal level curve and algorithm 40 with the coordinate axes abs and rss.

This currently determined digitized curve 40 is compared in the comparison unit 5 with the digitized standard curves and algorithms 601, 602, 603 . . . 60X . . . 60N (which are stored in the standard curve and algorithm storage unit 6, for example in the form of a three-dimensional matrix, in each case on metal objects which have defined different sizes and are positioned at defined different depths), together with the other parameters 601', 602', . . . 60X' . . . 60N' which are or can be associated with these curves and algorithms, and that standard ground distance/signal level curve or algorithm, for example 602, which is most similar to the currently determined curve or algorithm 40 there then being selected, and the depth and object size parameters pi associated with this being subdivided in the quantification unit 7 into indications (which correspond to a small number of depth and object size steps), for example from "deep" via "medium depth" to "shallow" as well as "large", "medium size" or "small", which are then passed on to the visual display unit 8 with the depth tl and object size go steps that have just been mentioned, in the form of illuminating small lamps or the like which reflect each of the said semi-quantitative parameters.

Appropriate inputs on an additional input unit 9 can be used to provide specific compensation for the parameters which have a disturbing influence on the shape and/or the profile of the respective currently determined ground distance/signal level curves or algorithms 40 and/or the operation of the standard algorithm, such as ground character parameters, metal quality parameters, and the like.

Figure 2:
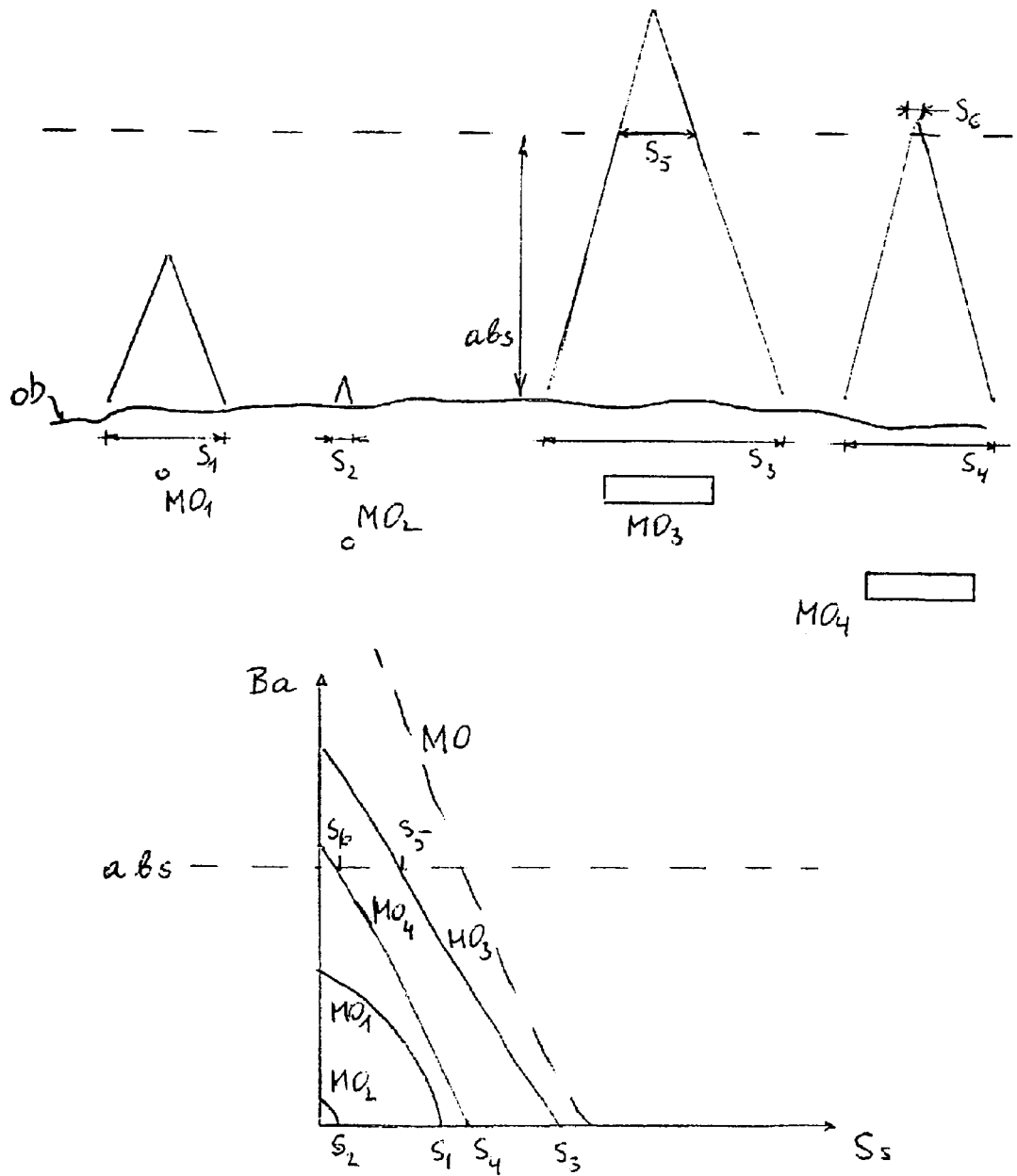
FIG. 2 are graphs showing the signals and the curve profiles obtained from objects at a different depth and having a different size.

Metal objects of different size located at different depths are shown at the top in FIG. 2. The objects MO1 and MO2 are relatively small; the objects MO3 and MO4 are relatively large. The objects MO1 and MO3 are at a relatively shallow depth in the ground; the objects MO2 and MO4 are at a relatively greater depth in the ground. The respective distance between the ground and the search head is annotated abs. The object MO1 produces a signal S1 at ground level ob, and this signal S1 decreases as the distance abs increases. The object MO2 produces a less strong signal S2 at ground level, and this signal S2 decays rapidly as the distance abs to the ground increases.

Owing to its size and its shallow depth, the object MO3 produces a signal S3 of considerable magnitude, which decays relatively slowly in the upward direction, and has still not decayed at a height abs, where it still produces a signal S5. The object MO4 produces a signal strength at ground level which is annotated S4. The signal from the object MO4 decays only above the height abs, and has a signal strength S6 at a distance abs from the ground which, in the present case in FIG. 2, represents the upper limit point of the vertical movement.

The diagram in FIG. 2 shows the curve profiles to be expected in practice. The signal profiles at the top of FIG. 2 are illustrated purely schematically; in practice, the signal does not decrease linearly as the distance from the ground increases. The bottom of FIG. 2 shows decay curves for the signal strength S with increasing distance Ba to the ground which actually reflect the practical conditions.

MO denotes a dashed curve which could correspond to a relatively large object, for which the signal strength Ss can still be detected at a relatively long distance Ba from the ground.

If the profile illustrated in the diagram at the bottom of FIG. 2 is converted proportionally to an acoustic indication signal, then a trained person can, draw conclusions about the depth and/or size of the object, merely on the basis of the change in tone of this acoustic signal.

This application claims the priority, under 35 U.S.C. § 119, of Austrian patent application No. A 1372/2004, filed Aug. 13, 2004; the disclosure of the prior application is herewith incorporated by reference in its entirety.

I claim:

1. A metal detector for finding and locating metal objects located underneath a ground surface, comprising:
a search head with a transmitting unit for transmitting electrical and/or magnetic signals or signal sequences past the surface;
a metal detection unit with a receiving unit for response signals or response signal sequences, said receiving unit having at least one response signal strength sensor, and a device for indicating or displaying a presence of a metal object underneath the surface;
a distance measurement sensor disposed on or in said search head and configured to estimate a depth and a size of the metal object and to determine an actual instantaneous geometric distance between said search head and the ground surface;
a measurement data logic unit disposed to receive data from said response signal sensor and said distance measurement sensor, said measurement data logic unit receiving sets of response signal measurement data and ground distance measurement data, and generating a respective instantaneous distance/signal strength curve or algorithm reflecting a functionality between the response signal and the distance between said search head and the surface;
a curve comparison unit connected for dataflow and data interchange with said measurement data logic unit, and a standard curve and algorithm storage unit connected for dataflow and data interchange with said curve comparison unit, said standard curve and algorithm storage unit containing a collection, matrix or library with a large number of standard distance/signal strength curves or algorithms, predetermined with a comparative detector of a same type from a large number of different, in each case predetermined standard conditions or with predetermined standard parameters, and being configured to be supplied therefrom with the standard distance/signal strength curves or algorithms, and equipped with software for selection of a standard distance/signal strength curve or algorithm stored in said standard curve and algorithm storage unit and most similar to the respective distance/signal strength curve or algorithm determined at that time for the metal object currently being located; and
a categorization unit for emitting from said curve and algorithm comparison unit parameter information associated with the respective standard distance/signal strength curve or algorithm selected from said standard curve storage unit and which is most similar, said categorization unit converting the information to qualitative or semi-quantitative object depth data and object size data, to a display unit configured to display in a small number of discrete measurement value steps at least those values that correspond to the depth and the size of the respective currently located measurement object, at a point which is easily visible for a user of the metal detector.

2. The metal detector according to claim 1, configured as a mine detector.

3. The metal detector according to claim 1, which further comprises at least one input unit connected for dataflow with said curve storage unit, for adjustment of a transmission signal frequency and/or for an adjustment of a parameter, and/or correction or compensation factor, which represents a current ground character, and/or for adjustment of the ferromagnetic or iron-equivalent parameter factor or correction factor corresponding to a presumed metal material of the metal object to be located at that time.

4. The metal detector according to claim 1, wherein said distance measurement sensor includes at least one of the following: an ultrasound echo sounding distance measurement device, a radar or laser light distance measurement device, or an optical range measurement device.

5. The metal detector according to claim 1, wherein said display unit is a visual display unit with two series of daylight-visible lamps or light-emitting diodes for displaying in steps a size of the located metal object and with a series for semi-quantitative indication or display, in steps, of the depth of the metal object.

6. The metal detector according to claim 5, wherein said two series of lamps or light-emitting diodes each contains three to five lamps or light-emitting diodes configured for a semi-quantitative indication or display with the display steps series:
"large" . . . "medium size" . . . "small"; or
"5, (4), 3, (2), 1";
and wherein the series for semi-quantitative indication or display, in steps, of the depth of the metal object has the following display levels:
"deep" . . . "medium-depth" . . . "shallow"; or
"5, 4, 3, 2, 1".

7. The metal detector according to claim 1, which further comprises an acoustic indication unit for indicating the depth and object size of the metal object with semi-quantitative output of a depth or an object size.

8. The metal detector according to claim 7, wherein said acoustic indication unit has indication steps with audibly different frequencies or with indication steps emitted in verbal form.

9. A metal detector for finding and locating metal objects located underneath a ground surface, wherein the ground has a specific ground character, comprising:

a search head with a transmitting unit for transmitting electrical and/or magnetic signals or signal sequences past the surface;

a metal detection unit with a receiving unit for response signals or response signal sequences, said receiving unit having at least one response signal strength sensor, and a device for indicating or displaying a presence of a metal object underneath the surface;

a distance measurement sensor disposed on or in said search head and configured to estimate a depth and a size of the metal object, said distance measurement sensor having a transmitting unit for transmitting signals at frequencies which can each be set to desired values, and configured to determine an actual instantaneous geometric distance between said search head and the ground surface;

a measurement data logic unit disposed to receive data from said response signal sensor and said distance measurement sensor, said measurement data logic unit receiving sets of response field strength measurement data and response signal level measurement data, and ground distance measurement data, in each case determined at a time in an event of a change in the distance between the search head and the ground surface when said search head is raised or lowered from or to the ground surface and generating a respective instantaneous distance/signal strength curve or algorithm reflecting a functionality between the response signal and the distance between said search head and the surface in digitized form or as a data packet;

a curve comparison unit connected for dataflow and data interchange to said measurement data logic unit, and a standard curve and algorithm storage unit connected for dataflow and data interchange to said curve comparison unit, said standard curve and algorithm storage unit containing, stored together with information associated therewith relating to various parameters, a collection, matrix or library with a large number of standard distance/signal strength curves or algorithms, represented in digitized form or as a data packet, predetermined with a comparative detector of a same type from a large number of different, in each case predetermined standard conditions or with predetermined standard parameters selected from the group consisting of depth, size, volume and/or area extent, shape and position of the measurement object, frequency of the signals transmitted from the transmitting unit, and the ground character, and being configured to be supplied therefrom with the standard distance/signal strength curves or algorithms, and equipped with software for selection of a standard distance/signal strength curve or algorithm stored in said standard curve and algorithm storage unit and most similar to the respective distance/signal strength curve or algorithm determined at that time for the metal object currently being located; and a categorization unit for emitting from said curve and algorithm comparison unit parameter information associated with the respective standard distance/signal strength curve or algorithm selected from said standard curve storage unit and which is most similar with respect to the size and depth of the metal object, said categorization unit converting the information to qualitative or semi-quantitative object depth data and object size data, to a display unit configured to display in a small number of discrete measurement value steps at least those values that correspond to the depth and the size of the respective currently located measurement object, at a point which is easily visible for a user of the metal detector.

10. A method for detecting metal objects at least partially located underneath a ground surface, which method comprises:

providing a metal detector with a search head having at least one transmitting unit for the transmission of electrical and/or magnetic signals or signal sequences into the ground, and with a metal detection unit having at least one receiving unit for response signals or response signal sequences with at least one field strength sensor, a ground distance measurement sensor, and a device for indicating or displaying a presence of a metal object in the ground, and with a distance measurement sensor;

in a first stage, defining a plurality of different discrete measurement condition parameters by positioning metal objects of a discrete different size, shape or form, spatial position and composed of different metals, in subsoils or grounds of different character at different discrete depths underneath the ground surface;

in a second stage, producing a family of standard distance/signal strength curves and algorithms applicable to a parameter that is in each case set for changing, discrete values, while keeping all other parameters constant, with the metal detector, in each case after choosing and setting one of the parameters and, optionally an appliance-specific parameter of the appliance to predetermined discrete different values, while keeping all other parameters constant, with the metal detector changing a distance of a search head from the ground surface, and storing the family in a standard curve and algorithm storage unit, and proceeding analogously with appropriate changes to the respective parameters to be changed discretely, and with each of the other parameters being kept constant, until a standard ground distance/signal strength curve and algorithm library has been obtained;

in a third stage, upon locating a metal object that is unknown in terms of parameters, changing a distance of the search head from the ground surface with the metal detector or a metal detector of a same type, and producing a current distance/signal strength curve or algorithm with a measurement data logic unit from the current ground distance and response signal strength measurement data and comparing in a comparison unit with standard distance/signal strength curves and algorithms called up from a standard curve and algorithm storage unit, and selecting a standard distance/signal strength curve or algorithm which is most similar in terms of a coordinate position and profile to the respective currently determined distance/signal strength curve or algorithm, and passing on a depth parameter and object size parameter to the device for indicating or displaying for conversion of the parameters to a small number of clear display steps; and in a fourth stage, displaying the clear display steps to a person operating the metal detector, for recovering the metal object on the basis of the semi-quantitatively displayed object size and depth.

11. The method according to claim 10, which comprises adapting the method steps to a mine sweeping operation.

* * * * *